(12) United States Patent (10) Patent No.: US 12,679,011 B2

Sung et al. (45) Date of Patent: Jul. 14, 2026

(54) METHOD FOR PREPARING METAL-POLYMER RESIN COMPOSITE

(71) Applicant: PLASTAL CO., LTD., Ansan-si (KR)

(72) Inventors: Mu Chang Sung, Ansan-si (KR); Seok Hyun Nam, Ansan-si (KR); Sung Ho Hong, Ansan-si (KR)

(73) Assignee: PLASTAL CO., LTD., Ansan-si (KR)

( * ) Notice: Subject to any disclaimer, the term of this patent is extended or adjusted under 35 U.S.C. 154(b) by 133 days.

(21) Appl. No.: 18/639,109

(22) Filed: Apr. 18, 2024

(65) Prior Publication Data

US 2024/0375330 A1 Nov. 14, 2024

(30) Foreign Application Priority Data

May 10, 2023 (KR) ........................ 10-2023-0060626

(51) Int. Cl.
| | |
|---|---|
| *B29C 45/14* | (2006.01) |
| *B29K 81/00* | (2006.01) |
| *B29K 105/20* | (2006.01) |
| *B29K 705/10* | (2006.01) |
| *C09K 13/04* | (2006.01) |
| *C25D 9/02* | (2006.01) |

(52) U.S. Cl.
CPC ........ *B29C 45/14311* (2013.01); *C09K 13/04* (2013.01); *B29C 2045/14868* (2013.01); *B29K 2081/04* (2013.01); *B29K 2105/20* (2013.01); *B29K 2705/10* (2013.01); *C25D 9/02* (2013.01)

(58) Field of Classification Search
CPC .............. B29C 45/14; B29C 45/14311; B29C 2045/14868; B29K 81/00; B29K 105/20; B29K 705/10; B29K 2081/04; B29K 2105/20; B29K 2705/10; C09K 13/04; C25D 9/02
See application file for complete search history.

(56) References Cited

U.S. PATENT DOCUMENTS

| | | | |
|---|---|---|---|
| 4,661,417 A | 4/1987 | Suzuki et al. | |
| 2015/0060132 A1* | 3/2015 | Murakawa ........... H05K 1/0298 |
| | | | 174/257 |

| | | | |
|---|---|---|---|
| 2016/0160371 A1 | 6/2016 | Chang et al. | |
| 2019/0134864 A1* | 5/2019 | Park .................. B29C 45/14795 |
| 2020/0171722 A1 | 6/2020 | Kim | |
| 2023/0108887 A1 | 4/2023 | Sung et al. | |
| 2024/0084474 A1 | 3/2024 | Sung et al. | |

FOREIGN PATENT DOCUMENTS

| | | | | | |
|---|---|---|---|---|---|
| CN | 107779931 A | * | 3/2018 | .............. | C25D 11/30 |
| CN | 108822293 A | * | 11/2018 | .............. | C08G 73/06 |
| JP | 2019217781 A | | 12/2019 | | |
| KR | 1019920003400 A | | 2/1992 | | |
| KR | 101606567 B1 | | 3/2016 | | |
| KR | 101893884 B1 | | 8/2018 | | |
| KR | 102148308 B1 | | 8/2020 | | |
| KR | 102388883 B1 | | 4/2022 | | |
| KR | 1020220107340 A | | 8/2022 | | |
| KR | 102470590 B1 | | 11/2022 | | |

OTHER PUBLICATIONS

CN108822293A English translation prepared Oct. 24, 2025 (Year: 2018).*

CN107779931A English translation prepared Oct. 24, 2025 (Year: 2018).*

Lee, Ju-Seong, "Based on Gold Gilding among the Plating Techniques," Journal of the Metal of Finishing Society of Korea, vol. 18, No. 1, May 1985, see p. 28.

* cited by examiner

*Primary Examiner* — Alison L Hindenlang

*Assistant Examiner* — Shibin Liang

(74) *Attorney, Agent, or Firm* — Dinsmore & Shohl LLP; Yongsok Choi, Esq.

(57) ABSTRACT

The present disclosure relates to a method for preparing a metal-polymer resin composite with excellent bonding strength and bonding uniformity. The method includes a pretreatment step (S1) of etching a metal member, an electrolysis process step (S2) of forming an adhesive coating layer on a surface of the pretreated metal member, a drying step (S3) of drying the metal member with the adhesive coating layer formed on the surface, and an injection-molding process step (S4) of bonding a polymer resin to the dried metal member, and the electrolysis process is performed in an electrolyte solution containing a sulfur-containing compound and a metal chelate compound.

13 Claims, No Drawings

METHOD FOR PREPARING METAL-POLYMER RESIN COMPOSITE

CROSS-REFERENCE TO RELATED APPLICATION

This application claims the benefit of priority to Korean Patent Application No. 10-2023-0060626, filed in the Korean Intellectual Property Office on May 10, 2023, the entire contents of which are incorporated herein by reference.

TECHNICAL FIELD

The present disclosure relates to a method for preparing a metal-polymer resin composite with excellent bonding strength and bonding uniformity.

BACKGROUND

A metal-resin composite is made by bonding or coating a polymer resin to a metal member to make it waterproof, and is widely used in an electronic device, an automobile part, and the like.

The metal-resin composite is typically prepared by washing, cleansing, and degreasing the metal, then etching the metal, then going through an electrolysis process again to form micropores in the metal and in an oxide film on a surface thereof, and then bonding the polymer resin to the metal via injection-molding or the like.

In the existing U.S. Patent Application Publication No. 2016-160371A1, presented is a method for preparing an aluminum-resin composite via degreasing aluminum at a relatively high temperature with a degreasing solution containing sodium carbonate or the like, then the etching it in an alkaline aqueous solution containing 30 to 60 wt % of sodium hydroxide, then forming micropores using an acidic aqueous solution containing phosphoric acid, sulfuric acid, oxalic acid, and citric acid as an electrolyte solution, and then the injection-molding.

In Korean Patent No. 1606567, presented is a method for preparing an aluminum-resin composite having a bonding strength equal to or greater than 38 Mpa by performing the etching process in two stages in an acidic aqueous solution containing hydrochloric acid and an acidic aqueous solution with an acid concentration in a range from 10 to 80% by weight, then performing electrolyzing with a diazole-based derivative compound, and then performing the injection-molding. In addition, in Korean Patent No. 2148308, presented is a method for preparing an aluminum-resin composite by performing the electrolyzing using an aluminum alloy metal material as an anode, in an acidic solution, and at a current density in a range from 0.1 to 2.0 A/dm2 and then performing the electrolyzing again in an aqueous solution containing a triazine thiol derivative. However, such existing technologies are all limited to the aluminum alloys.

Because copper or a copper alloy has excellent electrical conductivity and thermal conductivity, the copper or the copper alloy is widely used in electrical and electronic parts as a rolled material, a wrought material, a foil material, and a plating material, and an electronic circuit board (a printed wiring board) that combines a copper wiring as an indispensable wiring material with an insulating layer mainly made of resin is used in the electronic device.

There is a need to increase a bonding strength between the resin material and the copper wiring, and various technologies have been proposed. For example, to improve adhesion and bonding strength between the resin film and the copper foil, a method (an anchor effect) of roughening a surface of the copper foil and then attaching an adhesive or a heated resin surface to irregularities of the roughened surface is used. However, in a case of a high-frequency signal, because the signal flows through a surface layer of the wiring because of an effect called a skin effect, when the surface of the copper foil has the irregularities, a transmission distance becomes greater and thus a transmission loss increases. For this reason, in terms of the transmission loss, which is an important characteristic of the electronic circuit board, smoothness of the surface of the copper foil is required to be high to achieve low transmission loss. Therefore, there is a need for a method to bond the copper foil with a smooth surface to the resin material with a great strength.

PRIOR ART LITERATURE

Patent Document (Patent Document 1) U.S. Patent Application Publication No. 2016-160371A1
(Patent Document 2) Korean Patent No. 1606567
(Patent Document 3) Korean Patent No. 2148308

SUMMARY

The present disclosure has been made to solve the above-mentioned problems occurring in the prior art while advantages achieved by the prior art are maintained intact.

An aspect of the present disclosure provides a method for preparing a metal-polymer resin composite that directly bonds a polymer resin onto a metal member, but secures sufficient bonding strength and bonding uniformity.

The technical problems to be solved by the present disclosure are not limited to the aforementioned problems, and any other technical problems not mentioned herein will be clearly understood from the following description by those skilled in the art to which the present disclosure pertains.

To solve the above problem, the present disclosure provides a method for preparing a metal-polymer resin composite.

(1) According to an aspect of the present disclosure, a method for preparing a metal-polymer resin composite includes a pretreatment step (S1) of etching a metal member, an electrolysis process step (S2) of forming an adhesive coating layer on a surface of the pretreated metal member, a drying step (S3) of drying the metal member with the adhesive coating layer formed on the surface, and an injection-molding process step (S4) of bonding a polymer resin to the dried metal member, and the electrolysis process is performed in an electrolyte solution containing a sulfur-containing compound and a metal chelate compound.

(2) According to (1), the electrolyte solution may be prepared by adding and mixing the sulfur-containing compound and the metal chelate compound to and with distilled water.

(3) According to (1) or (2), the electrolyte solution may be prepared by mixing 5 g to 500 g of the sulfur-containing compound and 1 g to 100 g of the metal chelate compound for each 1 L of distilled water.

(4) According to one of (1) to (3), the sulfur-containing compound may be one or more selected from sulfuric acid, ammonium sulfate, and sodium sulfate.

(5) According to one of (1) to (3), the metal chelate compound may be one or more selected from a group consisting of copper ethylenediaminetetraacetate (EDTA-Cu), disodium copper ethylenediaminetetraacetate (EDTA-2NaCu), and diammonium copper ethylenediaminetetraacetate (EDTA-Cu(NH$_4$)$_2$).

(6) According to one of (1) to (5), the electrolyte solution further may contain one or more copper organic compounds selected from a group consisting of cupric chloride, copper (II) trifluoroacetate hydrate, cupric hydroxide, cupric carbonate, and copper oxide.

(7) According to one of (1) to (6), the electrolysis process (S2) may be performed by immersing the metal member in the electrolyte solution and performing electrolysis at a temperature in a range from 15° C. to 80° C. for 60 seconds to 3600 seconds at a constant voltage in a range from 0.1V to 50V.

(8) According to one of (1) to (7), the pretreatment step (S1) may be performed by sequentially performing a degreasing process step (S1-1), an etching process step (S1-2), and a desmut step (S1-3).

(9) According to (8), the etching process step (S1-2) may be performed by immersing the metal member in an etching solution at a temperature in a range from 15° C. to 80° C. for 30 seconds to 300 seconds.

(10) According to (9), the etching solution may be a mixed solution of 5 g to 500 g of strong acid and 5 g to 200 g of hydrogen peroxide for each 1 L of distilled water.

(11) According to (8), the desmut step (S1-3) may be performed via immersing the metal member in an alkaline aqueous solution; or via immersing the metal member in the alkaline aqueous solution and performing an ultrasonic treatment, and the immersing may be performed at a temperature in a range from 15° C. to 80° C. for 30 seconds to 300 seconds.

(12) According to (11), the alkaline aqueous solution may be a mixed solution of 5 g to 200 g of at least one selected from alkali metal hydroxide and alkaline earth metal hydroxide for each 1 L of distilled water.

(13) According to one of (1) to (12), the metal member may be washed with hot water before the drying in the drying step (S3).

(14) According to (13), the hot water washing may be performed using distilled water at a temperature in a range from 15° C. to 100° C.

(15) According to one of (1) to (14), the injection-molding process step (S4) may be performed by preheating the metal member to an injection-molding temperature and then directly injection-molding the polymer resin onto the preheated metal member.

(16) According to one of (1) to (15), the metal member may be one or more selected from a group consisting of copper, a copper clad, and a copper alloy.

(17) According to one of (1) to (16), the polymer resin may be one or more selected from a group consisting of polybutylene terephthalate, polyphenylene sulfide, polyphthalamide, polyethylene terephthalate, polycarbonate, polypropylene, polyimide, polyethylene, liquid crystal polymer, polyether ether ketone, polyaryl ether ketone, polyamide, polyamide6, and polyamide66.

DETAILED DESCRIPTION

Hereinafter, to facilitate understanding of the present disclosure, the present disclosure will be described in more detail.

Terms or words used in the description and claims of the present disclosure should not be construed as limited to their usual or dictionary meanings, and should be interpreted with meanings and concepts consistent with the technical idea of the present disclosure, based on the principle that the inventor is able to appropriately define the concept of the term to describe the invention thereof in the best way.

The present disclosure provides a method for preparing a metal-polymer resin composite that may provide a metal-polymer resin composite with excellent bonding strength and bonding uniformity (airtightness).

The method for preparing the metal-polymer resin composite according to an embodiment of the present disclosure includes a pretreatment step (S1) of etching a metal member; an electrolysis process step (S2) of forming an adhesive coating layer on a surface of the pretreated metal member; a drying step (S3) of drying the metal member with the adhesive coating layer formed on the surface thereof; and an injection-molding process step (S4) of bonding a polymer resin to the dried metal member, and the electrolysis process is performed in an electrolyte solution containing a sulfur-containing compound and a metal chelate compound.

In the past, a metal die casting and an injection-molded product were prepared separately and then bonded together using a double-sided tape, a bond, and the like, so that a thickness increased by the tape and/or the bond, a curing time was long, and a bonding strength (a tensile strength) was poor because a tolerance occurred by bonding the different materials.

However, the method for preparing the metal-polymer resin composite according to the present disclosure may prepare a composite that is a metal-polymer resin conjugate by going through the pretreatment step, the electrolysis process step, and a water washing and drying step to form the adhesive coating layer on the surface of the metal member, and then injection-molding the polymer resin directly on the surface of the metal member, thereby solving the above-mentioned problems at once and providing the composite with the bonding strength.

Hereinafter, the method for preparing the metal-polymer resin composite according to an embodiment of the present disclosure will be described in more detail by being divided into the steps.

Step (S1)

The step (S1) is the pretreatment step of etching the metal member to form micropores in the surface of the metal member.

In addition, the pretreatment step may further include a process of removing oil and impurities while forming the micropores in the surface of the metal member. Specifically, the pretreatment step may be performed by sequentially performing a degreasing process step (S1-1), an etching process step (S1-2), and a desmut step (S1-3).

In the method for preparing the metal-polymer resin composite of the present disclosure, the metal member may be applied without being particularly limited, but specifically, the metal member may be one or more selected from a group consisting of copper, a copper clad, and a copper alloy.

The degreasing process step (S1-1), as a process to remove the oil such that the surface of the metal member may be evenly etched, may be performed using a metal degreaser or via alcohol washing.

As another example, the degreasing process step may be performed by immersing the metal member in a degreasing solution containing one or more metal degreasers of sodium carbonate, sodium phosphate, sodium silicate, sodium bicarbonate, and sodium hexametaphosphate or immersing the metal member in alcohol, and an ultrasonic wave may be applied when necessary.

As a specific example, the degreasing process step may be performed by immersing the metal member in the alcohol and applying the ultrasonic wave, and may be performed at a temperature in a range from 20° C. to 80° C. for 30 to 300 seconds. In this regard, the alcohol may be methanol or ethanol.

The etching process step (S1-2), as a step for forming the micropores in the surface of the metal member, may be performed by immersing the metal member in an etching solution.

Specifically, the etching process may be performed by immersing the metal member in the etching solution at a temperature in a range from 15° C. to 80° C. for 30 seconds to 300 seconds.

In this regard, the etching solution may be an aqueous solution containing strong acid and hydrogen peroxide. Specifically, the etching solution may be a mixed solution of distilled water mixed with the strong acid and hydrogen peroxide.

More specifically, the etching solution may be a mixed solution in which 5 g to 500 g of the strong acid and 5 g to 200 g of hydrogen peroxide are mixed for each 1 L of the distilled water, and the strong acid may be one or more selected from sulfuric acid, hydrochloric acid, and nitric acid.

The desmut step (S1-3), as a step for removing the impurities remaining after the etching, may be performed via immersing the metal member in an alkaline aqueous solution containing an alkali metal or an alkaline earth metal hydroxide, or via immersing the metal member in the alkaline aqueous solution and an ultrasonic treatment. In this regard, the immersion may be performed at a temperature in a range from 15° C. to 80° C. for 30 seconds to 300 seconds.

Smut is formed by various factors, but in a case of an alloy for the die casting, because an impurity content is very high, about 3 to 5% and thus there are many components that are insoluble in the etching solution, so that the smut is generated in a great quantity. Accordingly, there was a problem that, even after going through the desmut process using the aqueous solution containing the strong acid, the high adhesive strength and the airtightness of the metal-polymer resin conjugate are not secured as the smut in an amount equal to or greater than a certain amount remains. Therefore, the technology of preparing the metal-polymer resin composite that directly injection-molds the polymer resin on the metal member was not able to be used.

However, the preparing method according to an embodiment of the present disclosure solves the problem of the prior art by performing the desmut step via immersing the metal member in the alkaline aqueous solution, or immersing the metal member in the alkaline aqueous solution and performing the ultrasonic treatment, and then going through the electrolysis process and the hot water washing and drying processes, which will be described later.

In one example, in terms of more desirable smut removal efficiency, the alkaline aqueous solution may be a mixed solution in which 5 to 200 g of at least one selected from alkali metal hydroxide and alkaline earth metal hydroxide is mixed with for each 1 L of the distilled water, and the alkali metal hydroxide or the alkaline earth metal hydroxide may be sodium hydroxide, potassium hydroxide, magnesium hydroxide, or calcium hydroxide, and more specifically, include one or more selected from sodium hydroxide and potassium hydroxide.

Additionally, the ultrasonic treatment may involve applying the ultrasonic wave in a range from 15 kHz to 70 kHz for 1 to 5 minutes, and in this case, the smut removal may be easier.

Step (S2)

The step (S2), as the electrolysis process step for forming the adhesive coating layer on the surface of the metal member, may be performed in the electrolyte solution containing the sulfur-containing compound and the metal chelate compound.

Specifically, the electrolysis process may be performed by immersing the metal member in the electrolyte solution and performing electrolysis at a temperature in a range from 15° C. to 80° C. for 60 seconds to 3600 seconds at a constant voltage in a range from 0.1V to 50V. More specifically, the electrolysis process may be performed by performing the electrolysis at a temperature in a range from 15° C. to 70° C. for 180 seconds to 2400 seconds at a constant voltage in a range from 0.1V to 10V and a current density in a range from $0.1 \text{ A/dm}^2$ to $5 \text{ A/dm}^2$. More specifically, the electrolysis process may be performed by performing the electrolysis at a temperature in a range from 20° C. to 40° C. for 600 seconds to 1200 seconds at a constant voltage in a range from 1V to 5V and a current density in a range from $1 \text{ A/dm}^2$ to $2 \text{ A/dm}^2$.

In addition, the electrolyte solution, as a result prepared by adding and mixing the sulfur-containing compound and the metal chelate compound to and with the distilled water, may be prepared by mixing 5 g to 500 g of the sulfur-containing compound and 1 g to 100 g of the metal chelate compound for each 1 L of the distilled water.

The sulfur-containing compound may be one or more selected from sulfuric acid, ammonium sulfate, and sodium sulfate, and may specifically be sulfuric acid.

In addition, the metal chelate compound may be one or more selected from a group consisting of copper ethylenediaminetetraacetate (EDTA-Cu), disodium copper ethylenediaminetetraacetate (EDTA-2NaCu), and diammonium copper ethylenediaminetetraacetate (EDTA-Cu(NH$_4$)$_2$), and may specifically be disodium copper ethylenediaminetetraacetate (EDTA-2NaCu).

As another example, the electrolyte solution may further contain one or more copper organic compounds selected from a group consisting of cupric chloride, copper (II) trifluoroacetate hydrate, cupric hydroxide, cupric carbonate, and copper oxide.

Via such electrolysis process, while the pores with an average size of several tens of nm may be evenly distributed and formed in the surface of the metal member, the smut that blocks the pores or grows in a form of dendrite on the surface to weaken the strength of bonding with the polymer resin may be almost completely removed.

Step (S3)

The step (S3), as a step for removing remaining solution and moisture, may be performed by drying the metal member on which the electrolysis process has been completed.

In addition, the step (S3) may involve washing the metal member with hot water before the drying, and in this case, the surface of the metal member may be stabilized.

The hot water washing may be performed using distilled water at a temperature in a range from 15° C. to 100° C.

The drying may be performed via hot air drying at a temperature in a range from 15° C. to 100° C. for 300 seconds to 1800 seconds.

Step (S4)

The step (S4), as the injection-molding process step for preparing the composite by bonding the polymer resin to the surface of the metal member, may be performed by directly injection-molding the polymer resin onto the metal member with an injection-molding machine.

Specifically, the injection-molding process step (S4) may be performed by preheating the metal member to an injection-molding temperature and then directly injection-molding the polymer resin onto the preheated metal member. In this regard, the preheating may be performed by applying heat of 80° C. to 300° C. to the metal member for 1 to 300 minutes using a hot plate, a hot air blower, or the like.

In the method for preparing the metal-polymer resin composite of the present disclosure, the polymer resin may be applied without being particularly limited, but specifically, the polymer resin may be one or more selected from a group consisting of polybutylene terephthalate (PBT), polyphenylene sulfide (PSS), polyphthalamide (PPA), polyethylene terephthalate (PET), polycarbonate (PC), polypropylene (PP), polyimide (PI), polyethylene (PE), liquid crystal polymer (LCP), polyether ether ketone (PEEK), polyaryl ether ketone (PAEK), polyamide (PA), polyamide6 (PA6), and polyamide66 (PA66).

The liquid crystal polymer (LCP) is a crystalline polymer, and thus, a bonding surface tends to break when the liquid crystal polymer (LCP) is combined with the metal. Further, polyethylene (PE) or polypropylene (PP) is relatively soft compared to other polymers such as polyphenylene sulfide (PPS) and thus is easily deformed by a tensile force or a stress, so that polyethylene (PE) or polypropylene (PP) tends to be relatively easily deviated from the nano-sized pores into which it has penetrated, resulting in a relatively weak bonding strength. Therefore, in a case of such polymer resin, even when it is prepared according to the present disclosure, the bonding strength is only 20 MPa or greater. A polymer resin with a melting point equal to or lower than about 200° C., such as polyethylene and polypropylene, or a crystalline polymer resin, such as the liquid crystal polymer, usually behaves as above. On the other hand, in a case of the polymers such as polybutylene terephthalate (PBT), polyphenylene sulfide (PSS), polyphthalamide (PPA), polyethylene terephthalate (PET), polycarbonate (PC), polyether ether ketone (PEEK), polyaryl ether ketone (PAEK), polyamide (PA), polyamide6 (PA6), and polyamide66 (PA66), when the polymer resin penetrates into the nanopores and is cured via the injection-molding, the polymer resin is not easily deviated even when a strong tensile force is applied, and thus, has a very high bonding strength equal to or greater than 30 MPa. A polymer resin with a melting point equal to or higher than 200° C. usually behaves as above.

EXAMPLES

Hereinafter, the present disclosure will be described in more detail via present examples. However, following present examples are intended to illustrate the present disclosure and do not limit the scope of the present disclosure.

Example 1

Twenty specimens were prepared by processing a 3 mm-thick copper metal member (C1100) into a size of 40×12×3 mm. An additional hole of 4 mm in size was machined into each of the previously prepared specimens such that each specimen is able to be mounted on a rack during bonding. The specimens were mounted on the rack using the machined holes. The rack on which the prepared specimens are mounted was put into alcohol and then ultrasonic degreasing was performed for 60 seconds to remove oil and impurities from surfaces of the specimens. The specimens washed above were etched by being put in a mixture of sulfuric acid (20% by weight) and hydrogen peroxide (20% by weight) in distilled water (50° C.) in a bubble stirrer for 5 minutes, then immersed in a desmut solution (sodium hydroxide 5% aqueous solution), and then ultrasonic-cleaned to remove impurities and smut. The washed specimens were put into an electrolyte solution, a mixture of sulfuric acid (10% by weight) and EDTA-2NaCu (3% by weight) in distilled water (60° C.) and electrolyzed at a constant voltage of 5V for 1200 seconds to form a coating layer. Thereafter, the specimens were hot water-washed with distilled water at 80° C. and then dried with a hot air dryer at 120° C. for 1200 seconds.

Thereafter, copper-resin composites were prepared by injection-molding polyphenylene sulfide (PPS, SABIC) onto the 20 specimens. As an injection-molding machine, a 15-ton injection-molding machine from Daekyung Hydraulics Co. was used, and the injection-molding was performed by setting an injection-molding temperature to 170° C., a nozzle temperature to 300° C., an injection-molding pressure to 70 bar, and a hold pressure to 5 seconds. In this regard, the specimens were preheated such that a temperature of the specimens before the injection-molding becomes similar to the injection-molding temperature. Of a total of the 20 specimens, 10 were used for a tensile strength test and the remaining 10 were used for an airtightness test.

Example 2

A copper-resin composite was prepared in the same manner as Example 1, except that the hot water washing was not performed as in Present Example 1.

Example 3

A copper-resin composite was prepared in the same manner as Example 1, except that the specimen preheating before the injection-molding was not performed.

Comparative Example 1

A copper-resin composite was prepared in the same manner as Example 1, except that a mixture of sulfuric acid (10% by weight) in distilled water (60° C.) was used as the electrolyte solution during the electrolysis process in Example 1.

Comparative Example 2

A copper-resin composite was prepared in the same manner as Example 1, except that the etching process was not performed in Example 1.

Comparative Example 3

A copper-resin composite was prepared in the same manner as Example 1, except that the electrolysis process was not performed in Example 1.

Experimental Example

Bonding strengths (tensile strengths) and airtightness of the copper-resin composites prepared in Present Examples and Comparative Examples were subjected to comparative analysis, and results are shown in Table 1 below.

(1) Bonding Strength (Tensile Strength)

Using a tensile tester (UTM, Time Group), the tensile strengths at a time point when copper and resin are separated from each other were measured via pulling at a speed of 5 mm/min. The same experiment was repeated 10 times and the results are expressed as average values.

(2) Airtightness

To identify the bonding uniformity, amounts of helium leakage at an interface were measured using a helium leakage test equipment (Canon ANELVA). When the helium leakage amount is equal to or smaller than $10^{-8}$ Pa·m³/s, the bonding uniformity is marked as good, and when the helium leakage amount exceeds $10^{-8}$ Pa·m³/s, the bonding uniformity is marked as bad. As for the airtightness test, the same experiment was also repeated on the 10 specimens to identify the number of defects.

TABLE 1

| Division | Tensile strength (MPa) | Airtightness (units) | |
|---|---|---|---|
| | | Pass | Fail |
| Example 1 | 46.04 | 10 | 0 |
| Example 2 | 43.22 | 8 | 2 |
| Example 3 | 43.67 | 6 | 4 |
| Comparative Example 1 | 41.31 | 2 | 8 |
| Comparative Example 2 | 39.39 | 5 | 5 |
| Comparative Example 3 | 25.36 | 0 | 10 |

As shown in Table 1, it was identified that the copper-resin composites of Example 1 to Example 3 were superior to Comparative Example 1 to Comparative Example 3 in both the bonding strength and the airtightness. It was identified that, in the case of the copper-resin composite of Comparative Example 1 prepared in the same manner as Example 1 except that the electrolyte solution that does not contain the metal chelate compound was used during the electrolysis process, and the copper-resin composite of Comparative Example 2 prepared in the same manner as Example 1 except that the etching process was not performed, the tensile strengths were significantly reduced to 90% and 85% and the airtightness was also significantly reduced, compared to Present Example 1.

In addition, it was identified that, in a case of Comparative Example 3, both the tensile strength and the airtightness were poor, with the tensile strength being half that of Example 1 and a passing rate for the airtightness being 0%. In this regard, Comparative Example 3 was prepared under the same conditions as Example 1, except that the electrolysis process was not performed.

Accordingly, it was identified that the method for preparing the metal-polymer resin composite including the pretreatment step, the electrolysis process step, the drying step, and the injection-molding process step is effective in preparing the metal-resin conjugate with the excellent bonding strength and bonding uniformity.

On the other hand, Example 2 and Example 3 showed tensile strength and airtightness decreased by about 6% and 5% compared to those of Example 1. In this regard, Example 2 and Example 3 were subjected to the same other processes as Example 1, but were not subjected to the hot water washing before the drying (Example 2) or were not subjected to the specimen preheating during the injection-molding process (Example 3).

With the above results, it was identified that, in terms of obtaining the metal-polymer resin composite with more excellent bonding strength and bonding uniformity, it may be advantageous to further include the hot water washing and metal member preheating steps in the method for preparing the metal-polymer resin composite of the present disclosure.

The method for preparing the metal-polymer resin composite according to the present disclosure may prepare the metal-polymer resin composite with the excellent bonding strength and bonding uniformity (airtightness).

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for preparing a metal-polymer resin composite, the method comprising:
   a pretreatment step (S1) of etching a metal member, which is one or more selected from a group consisting of copper, a copper clad, and a copper alloy;
   an electrolysis process step (S2) of forming an adhesive coating layer on a surface of the pretreated metal member;
   a drying step (S3) of drying the metal member with the adhesive coating layer formed on the surface; and
   an injection-molding process step (S4) of bonding a polymer resin to the dried metal member,
   wherein the electrolysis process is performed in an electrolyte solution containing a sulfur-containing compound and a metal chelate compound,
   wherein the injection-molding process step (S4) is performed by preheating the metal member to an injection-molding temperature and then directly injection-molding the polymer resin onto the preheated metal member, and
   wherein the electrolyte solution is prepared by mixing 5 g to 500 g of the sulfur-containing compound and 1 g to 100 g of the metal chelate compound for each 1 L of distilled water.

2. The method of claim 1, wherein the sulfur-containing compound is one or more selected from sulfuric acid, ammonium sulfate, and sodium sulfate.

3. The method of claim 1, wherein the metal chelate compound is one or more selected from a group consisting of copper ethylenediaminetetraacetate (EDTA-Cu), disodium copper ethylenediaminetetraacetate (EDTA-2NaCu), and diammonium copper ethylenediaminetetraacetate (EDTA-Cu(NH₄)₂).

4. The method of claim 1, wherein the electrolyte solution further contains one or more copper organic compounds selected from a group consisting of cupric chloride, copper (II) trifluoroacetate hydrate, cupric hydroxide, cupric carbonate, and copper oxide.

5. The method of claim 1, wherein the electrolysis process (S2) is performed by immersing the metal member in the electrolyte solution and performing electrolysis at a temperature in a range from 15° C. to 80° C. for 60 seconds to 3600 seconds at a constant voltage in a range from 0.1V to 50V.

6. The method of claim 1, wherein the pretreatment step (S1) is performed by sequentially performing a degreasing process step (S1-1), an etching process step (S1-2), and a desmut step (S1-3).

7. The method of claim 6, wherein the etching process step (S1-2) is performed by immersing the metal member in an etching solution at a temperature in a range from 15° C. to 80° C. for 30 seconds to 300 seconds.

8. The method of claim 7, wherein the etching solution is a mixed solution of 5 g to 500 g of strong acid and 5 g to 200 g of hydrogen peroxide for each 1 L of distilled water.

9. The method of claim 6, wherein the desmut step (S1-3) is performed via immersing the metal member in an alkaline aqueous solution; or via immersing the metal member in the alkaline aqueous solution and performing an ultrasonic treatment, wherein the immersing is performed at a temperature in a range from 15° C. to 80° C. for 30 seconds to 300 seconds.

10. The method of claim 9, wherein the alkaline aqueous solution is a mixed solution of 5 g to 200 g of at least one selected from alkali metal hydroxide and alkaline earth metal hydroxide for each 1 L of distilled water.

11. The method of claim 1, wherein the metal member is washed with hot water before the drying in the drying step (S3).

12. The method of claim 11, wherein the hot water washing is performed using distilled water at a temperature in a range from 15° C. to 100° C.

13. The method of claim 1, wherein the polymer resin is one or more selected from a group consisting of polybutylene terephthalate, polyphenylene sulfide, polyphthalamide, polyethylene terephthalate, polycarbonate, polypropylene, polyimide, polyethylene, liquid crystal polymer, polyether ether ketone, polyaryl ether ketone, polyamide, polyamide6, and polyamide66.

* * * * *